May 24, 1938.   L. WETHERILL   2,118,660
TRANSFORMER LOAD INDICATOR
Filed Sept. 10, 1936
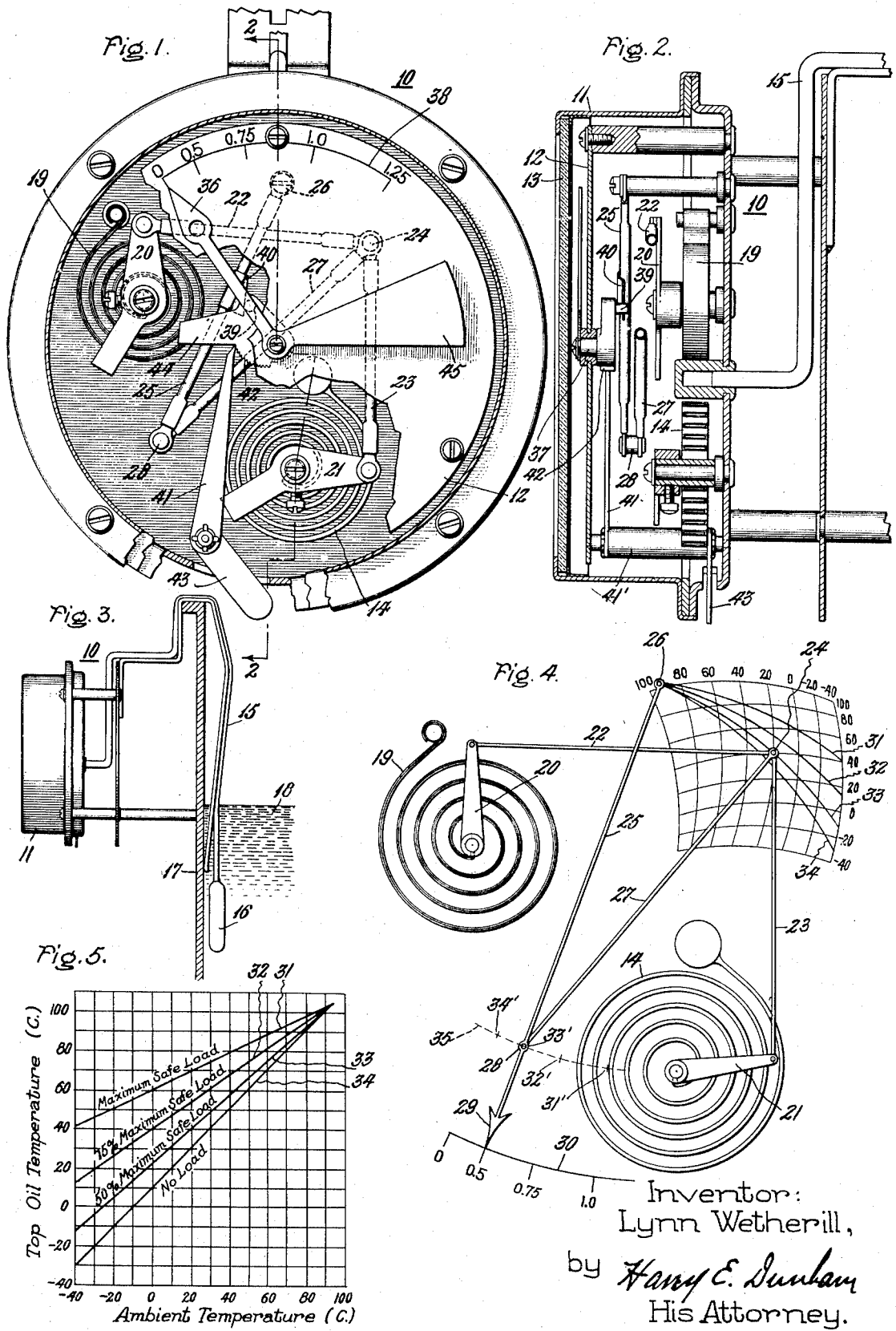
Inventor:
Lynn Wetherill,
by Harry E. Dunham
His Attorney.

Patented May 24, 1938

2,118,660

UNITED STATES PATENT OFFICE 2,118,660

TRANSFORMER LOAD INDICATOR

Lynn Wetherill, Pittsfield, Mass., assignor to General Electric Company, a corporation of New York Application September 10, 1936, Serial No. 100,159

5 Claims. (Cl. 73—350)

My invention relates to transformer load indicators. As the load on a transformer increases, the internal losses increase. These losses appear as heat and if the load becomes too great, it may cause such internal temperatures as may cause damage to the transformer. The maximum load which a transformer can carry safely is not always the same but varies with the rate at which the internal heat can be dissipated. Thus, a greater load can be safely carried when the air surrounding the transformer is cold than when it is warm because the heat from the transformer will be dissipated more rapidly to the cold air. For this reason, an indication of the load which a transformer is carrying at any time is often little indication of whether or not the transformer is overloaded. However, instruments have been proposed and used which indicate what percentage of the maximum safe load the transformer is carrying and, with this latter indication, it is easy to determine at any time whether the load on a transformer can be safely increased and if so, how much more load the transformer can safely carry.

The general object of the present invention is to provide an improved instrument for indicating with substantial accuracy under any temperature and load conditions the ratio of the load being carried by a transformer to the maximum safe load which the transformer could carry under the same temperature conditions.

The invention will be better understood from the following description taken in connection with the accompanying drawing in which Fig. 1 is a view of a load indicating instrument constructed in accordance with the invention, parts being broken away to show details; Fig. 2 is a sectional view of the instrument on the line 2—2 of Fig. 1; Fig. 3 is a side view of the instrument assembled with a supporting structure arranged for suspension over the upper edge of the casing of a transformer; Fig. 4 is an explanatory diagrammatic view of the instrument; Fig. 5 is an explanatory curve diagram.

Like reference characters indicate similar parts in the different figures of the drawing.

The preferred form of the instrument which forms the subject matter of the present invention is shown most clearly in Figs. 1 and 2. This instrument 10 includes a casing 11 with a face 12 covered by a transparent glass 13 to exclude dust. The casing 11 encloses a Bourdon tube 14 connected by a capillary tube 15 to a bulb 16. The instrument 10 is mounted on a frame arranged for suspension over the upper edge of the wall of a casing 17 of a transformer immersed in a specially prepared insulating oil 18 or other suitable insulating liquid with the bulb 16 immersed in the liquid 18 near its top surface within the casing 17 and the instrument casing 11 with its enclosed parts suspended in the air outside the casing 17. The instrument casing 11 also encloses a thermostat 19 which is thermally responsive to the temperature of the air outside the casing 17 or, in other words, to the ambient temperature. The Bourdon tube 14 is responsive to the temperature of the top oil 18. An arm or lever 20 is secured to a shaft controlled by the thermostat 19 and a similar arm or lever 21 is secured to a shaft controlled by the Bourdon tube 14. One end of a rod or link 22 is pivotally connected to the outer end of the lever 20. One end of a similar rod or link 23 is connected to the outer end of the lever 21. The other ends of the two links 22 and 23 are connected together by a pivotal connection 24.

As shown diagrammatically in Fig. 4, a link 25 with a pivotal support 26 at one end is connected by a link 27 to the pivotal connection 24 between the links 22 and 23, the link 25 and the link 27 being connected together by a pivotal connection 28. The link 25 is extended beyond the connection 28 to form a pointer 29 movable over a scale 30.

If the parts which have been so far described are properly proportioned, then the pointer 29 will indicate at any time on the scale 30 what proportion of the maximum safe load the transformer is carrying. Thus, in Fig. 4, the pointer 29 is indicating the value 0.5 which means that the transformer is carrying 50% of the maximum load which it might carry safely under the same ambient temperature conditions. The necessary proportions and relations of the various parts of the instrument have not been calculated mathematically as the calculations would be extremely complicated, but it has been found by very careful tests that an instrument will give very accurate indications when designed graphically in accordance with the following explanation.

The position of the pivotal connection 24 is controlled by the angular positions of the levers 20 and 21 and in turn determines the position of the pointer 29 on the scale 30. The thermostat 19 and the Bourdon tube 14 are preferably arranged to impart angular movements of about 90° to 100° to their respective levers 20 and 21 between the extreme positions corresponding to the maximum variations to be expected in the temperatures of the air outside the transformer casing 17 and of the insulating liquid 18. The levers 20 and 21 should be at approximately a right angle to each other when the ambient and liquid temperatures which control them are about midway between their maximum and minimum values. With the levers 20 and 21 in these relative positions, the links 22 and 23 should be so proportioned that the angle between them will be about a right angle and they should be of about the same length.

The temperature of a transformer increases with its load, and the maximum load which a transformer can safely carry is determined by the maximum temperature which will not injure the transformer. The top oil temperature depends upon the ambient temperature and the load which the transformer is carrying. This top oil temperature can be determined for any given load and ambient temperature conditions either by testing an actual transformer or by methods of calculation well known to transformer engineers. The results may be shown in the form of curves, such as the curves 31, 32, 33, and 34 of Fig. 5. The curve 31 indicates the top oil temperatures corresponding to different ambient temperatures when the transformer is carrying its maximum safe load. The curve 32 indicates the top oil temperatures corresponding to different ambient temperatures when the transformer is carrying 75% of the maximum load which it could carry under the different ambient temperature conditions. The curve 33 indicates the top oil temperatures corresponding to different ambient temperatures when the transformer is carrying 50% of the maximum safe load which it could carry under the different ambient temperature conditions. The curve 34 indicates the top oil temperatures corresponding to different ambient temperatures when the transformer is carrying no load, but assuming that the transformer is excited and assuming that the excitation of the transformer will increase the temperature of the oil 10° above any ambient temperature. It is obvious that these curves 31 to 34 inclusive will meet in a single point where the top oil temperature is 10° above the ambient temperature. The position of the pivotal connection 24 is controlled by the two levers 20 and 21 and moves in response to changes in either the ambient temperature or the top oil temperature or both. For any given ambient temperature the position of the lever 20 is fixed and the pivotal connection 24 may be moved by the lever 21 along an arc of a circle, and arcs of circles may thus be drawn to correspond to different ambient temperatures. In Fig. 4 the position of the lever 20 corresponds to an ambient temperature of 20°. In a similar manner, arcs of circles may be drawn for different positions of the lever 21 corresponding to different top oil temperatures. These two families of arcs constitute a coordinate system between ambient and top oil temperatures corresponding to the coordinate system shown in Fig. 5, except that the coordinates of the system shown in Fig. 4 are curvilinear while those of Fig. 5 are rectilinear. The curves 31, 32, 33, and 34 of Fig. 5 may now be transferred to the curvilinear coordinate system of Fig. 4 where they will appear of course as curved lines rather than as substantially straight lines. It will be found that each of the curves 31, 32, 33, and 34 when transferred to the curvilinear system of Fig. 4 will be at least very nearly an arc of a true circle, that these arcs will of course intersect in a single point, and that all of these arcs have radii of very nearly the same length. If the curves 31, 32, 33, and 34 differ at all from arcs of true circles having the same radii, then they should be changed slightly to meet these conditions and it is considered preferable that the arc of the circle be selected which most nearly fits the curve 31 because the greatest instrument accuracy is usually desirable for maximum safe load conditions rather than for conditions under which the transformer is only partially loaded. The centers 31', 32', 33' and 34' of the curves 31, 32, 33, and 34 are now found as indicated in Fig. 4 and an arc 35 of a circle is drawn through these centers. The pivotal support 26 of the link 25 should be located at the center of the arm 35 which will be at the intersection of the curves 31, 32, 33, and 34. The link 27 is disposed in the angle between the links 22 and 23 and should be equal to the radii of the curves 31, 32, 33 and 34 and therefore to the length of the link 25 between its pivotal support 26 and the pivotal connection 28 so that the pivotal connection 28 between the links 25 and 27 will always be somewhere on the arc 35, depending upon the position of the pivotal connection 24.

The curves 31, 32, 33, and 34 on the curvilinear coordinate diagram of Fig. 4 form a chart upon which the position of the pivotal connection 24 will indicate at any time the proportion or percentage of the maximum safe load which the transformer is carrying. Additional load curves may of course be added to the chart if desired so that the indication may be more easily read. This form of chart, however, may not be as desirable as a linear scale provided with a pointer and such a linear chart or scale 38 is made possible by the addition of the links 25 and 27 connected and proportioned as has already been described. The indications on the scale 38 and on the curvilinear coordinate chart are identical.

In the preferred form of the invention shown in Fig. 1, the pointer 29 of Fig. 4 is omitted and a pointer 36 secured at one end to a pivoted stud 37 is movable over a linear chart or scale 38. The pointer 36 is provided with a pin 39 in the path of a cam 40 carried by the link 25. The distance between the pin 39 and the pivot 37 is relatively small as compared with the length of the pointer 36 so that any angular movement of the link 25 produces a considerably greater angular movement of the pointer 36. The graduations of the scale 38 are therefore more widely spaced than the corresponding graduations of the scale 38 of Fig. 4 and they may therefore be read more easily. The pointer 36 is of the maximum reading type, that is, the link 25 will move the pointer 36 in a clockwise direction but this pointer will be held in its maximum position by a stop 41 engaging a roughened or toothed surface of a member 42 secured to the pivot 37 of the pointer. The stop 41 is mounted on a shaft 41' provided with a handle 43 extending through an opening in the casing 11. By raising this handle 43 the stop 41 will be disengaged from the member 42 to allow the pointer 36 to be returned by a weight 44 to the zero position on the scale 38 or to a position in which the pin 39 strikes the cam 40. A vane 45 rotatable with the pointer 36 functions as a danger signal. This vane may be concealed under normal conditions but may be arranged to appear through a window in the casing when the reading of the pointer 36 approaches a danger point on the scale 38.

The maximum safe load which a transformer can carry is limited by the maximum safe temperature of the transformer. This temperature increases with the load and also with the ambient temperature. A greater load can be carried with safety therefore under low ambient temperature conditions than under high ambient temperature conditions. A simple indication of the load itself is therefore not very helpful in determining what proportion or percentage of the maximum safe load a transformer may be carrying. The present invention, however, provides an instrument which shows directly at any time and under any ambient temperature conditions whether a transformer is fully loaded or overloaded, or, if underloaded, then the relation between the load being carried by the transformer and the maximum safe load which the transformer could carry under the same liquid and air temperature conditions. The instrument also indicates how much more load it can safely carry.

The invention has been explained by describing useful forms thereof but it is obvious that changes may be made without departing from the spirit of the invention and the scope of the appended claims.

What I claim as new and desire to secure by Letters Patent of the United States, is:

1. An indicating instrument including means for response to temperature changes in the cooling liquid of liquid-immersed electrical apparatus, means for response to temperature changes in the air surrounding the apparatus, a link controlled by each temperature-responsive means, a pivotal connection between the links, a load chart, and indicating means controlled by the links, said chart and the lengths and angular relations of said links being proportioned to indicate the relation between the load carried by the apparatus and the maximum safe load under the same liquid and air temperature conditions.

2. An indicating instrument including means for response to temperature changes in the cooling liquid of liquid-immersed electrical apparatus, means for response to temperature changes in the air surrounding the apparatus, a link controlled by each temperature-responsive means, a pivotal connection between the links, a load chart, and indicating means movable over said chart and pivotally connected to said pivotal connection, said chart and the lengths and angular relations of said links being proportioned to indicate the relation between the load carried by the apparatus and the maximum safe load under the same liquid and air temperature conditions.

3. An indicating instrument including two levers, means for controlling one of said levers in response to temperature changes in the cooling liquid of liquid-immersed electrical apparatus, means for controlling the other lever in response to temperature changes in the air surrounding the apparatus, a link pivotally connected at one end to one lever, a second link pivotally connected at one end to the other lever, a pivotal connection between the other ends of said links, a load chart, and indicating means controlled by said links, said chart and the lengths and angular relations of said levers and links being proportioned to indicate the relation between the load carried by the apparatus and the maximum safe load under the same liquid and air temperature conditions.

4. An indicating instrument including two levers, means for controlling one of said levers in response to temperature changes in the cooling liquid of liquid-immersed electrical apparatus, means for controlling the other lever in response to temperature changes in the air surrounding the apparatus, a link pivotally connected at one end to one lever, a second link pivotally connected at one end to the other lever, a pivotal connection between the other ends of said links, a load chart, and indicating means connected to the pivotal connection between said links, said chart and the lengths and angular relations of said levers and links being proportioned to indicate the relation between the load carried by the apparatus and the maximum safe load under the same liquid and air temperature conditions.

5. An indicating instrument including two levers, means for controlling one of said levers in response to temperature changes in the cooling liquid of liquid-immersed electrical apparatus, means for controlling the other lever in response to temperature changes in the air surrounding the apparatus, said levers being disposed at approximately a right angle to each other during average temperature conditions of the liquid and air, a link pivotally connected at one end to one lever, a second link pivotally connected at one end to the other lever, a pivotal connection between the other ends of said links, said links being disposed at approximately a right angle to each other during average temperature conditions of the liquid and air, a load chart, a pointer movable over said load chart, and a link connecting said pointer and said pivotal connection, said latter link being disposed in the angle between said first two links, and said chart and the lengths and angular relations of said levers and links being proportioned to indicate the relation between the load carried by the apparatus and the maximum safe load under the same liquid and air temperature conditions.

LYNN WETHERILL.